United States Patent

[11] 3,564,226

[72] Inventor Lawrence Seligman
Belmont, Mass.
[21] Appl. No. 604,956
[22] Filed Dec. 27, 1966
[45] Patented Feb. 16, 1971
[73] Assignee Digital Equipment
Maynard, Mass.

[54] PARALLEL BINARY PROCESSING SYSTEM HAVING MINIMAL OPERATIONAL DELAY
14 Claims, 3 Drawing Figs.

[52] U.S. Cl. .......... 235/164, 235/168
[51] Int. Cl. .......... G06f 7/50, G06f 7/52
[50] Field of Search .......... 235/156, 159, 160, 164, 168

[56] References Cited

UNITED STATES PATENTS

| | | | |
|---|---|---|---|
| 3,231,725 | 1/1966 | Davis et al. | 235/164X |
| 3,330,946 | 7/1967 | Scuitto | 235/160 |
| 3,131,293 | 4/1964 | Bush et al. | 235/156 |
| 3,370,274 | 2/1968 | Kettley et al. | 340/172.5 |

*Primary Examiner*—Malcolm A. Morrison
*Assistant Examiner*—David H. Malzahn
*Attorney*—Cesari and McKenna

ABSTRACT: A new electronic digital processor element has two groups of zero-delay registers, a single zero-delay adder, and zero-delay gates arranged to transfer information in the registers to the adder input terminals and to transfer information output from the adder to the registers. All information transfers between the registers are by way of the adder and are controlled by sets of simultaneous level-type signals selectively applied to the gates.

INVENTOR.
LAWRENCE SELIGMAN
BY
Blair Buckles & Cesari
ATTORNEYS

INVENTOR.
LAWRENCE SELIGMAN
BY
Blair Buckles & Cesari
ATTORNEYS

PARALLEL BINARY PROCESSING SYSTEM HAVING MINIMAL OPERATIONAL DELAY

This invention relates to electronic digital data processing equipment. More particularly, it relates to a data processing system in which the processor element consists of logic circuits having essentially no delay between the receipt of input signals and production of the response to the input signals. The processor element transfers information between its registers in response to sets of simultaneous level-type signals that operate gate circuits to form the desired signal path for the transfer.

One advantage of the processor element is that there is minimal introduction of errors during the transfer of information between the processor registers, particularly of errors due to noise that results from a circuit settling to a new condition in response to input signals.

Another advantage of the new processor element is that it provides the operational advantages of prior advanced computers, but with less complex circuits. These relatively simple circuits are less costly than more complex circuits and in general have greater reliability.

BACKGROUND

In prior digital computing systems, the logic circuits generally have built-in delays. For example, the output of a register generally remains unchanged for a finite time after the receipt of input signals that will ultimately change the register contents. With this prior arrangement, simultaneous pulses are used to load the information stored in a first register into a second register and to transfer new information to the first register. This is because the first register interposes a delay between receipt of the new information and the application thereof to its output terminals. The delay, for example, can be interposed between the input terminals of the register and its storage elements, e.g., flip-flops.

After the new signals are applied to the flip-flops, a brief but finite "settling" time elapses before one can be certain that all the register flip-flops store the new information. Accordingly, successive timing pulses are separated by an interval longer than the largest time required for "settling" to occur in any of the processor circuits.

A general object of the present invention is to provide an improved electronic digital data processing system. A further object is to provide a digital data processing system having a low cost relative to its performance capability.

It is also an object that the data processing system be highly reliable. In particular, it should be relatively free from errors stemming from noise and other spurious signals. Further, the system should employ logic circuits that are relatively simple and have relatively high reliability, i.e., that operate for prolonged periods with comparatively little maintenance.

A further object is to provide a digital data processing system of relatively high speed operation, particularly with successive operations that are performed without use of the memory element.

Another object of the invention is to provide a digital data processing system that can operate at a relatively high speed with circuits that have limited frequency response; that is, with circuits that are incapable of substantially faithfully reproducing signals having relatively fast rise and fall times.

A further object is to provide a digital data processing system of the above character having a relatively high degree of transfer flexibility; that is, which is capable of transferring information between essentially any of the registers in its processor element. Again, it is desired that the system provide such operation with relatively simple and low cost logic circuits.

Other objects of the invention will in part be obvious and will in part appear hereinafter.

The invention accordingly comprises the features of construction, combination of elements, and arrangement of parts exemplified in the construction hereinafter set forth, and the scope of the invention is indicated in the claims.

SUMMARY OF INVENTION

In a data processing system embodying the invention, the memory element is conventional, having a core memory and, where desired, additional storage as in magnetic drums or tapes. The in-out element is also conventional, typically including a teletypewriter, a perforated tape unit or a cathode-ray tube display unit.

The processor element, however, is not conventional. It consists of several "zero-delay" registers arranged to apply digital words to a parallel adder via an A bus. Further, a memory buffer register is arranged to apply digital words to the adder via a separate B bus that also receives words from the memory element. The output from the adder can be applied to any one of these registers. It can also be applied to any one of the in-out devices, and the in-out devices can transfer information to any one of the registers.

Data transfers within the processor element are controlled with zero-delay gates operated by a control unit. The control unit operates in response to (1) instruction words in an instruction register, (2) information in the memory buffer, and (3) according to its own status.

Thus, in the present processor element, the adder is interposed in an information path linking the memory element and the memory buffer register with the other registers of the processor element and with the in-out element. The adder is also part of a second information path linking the other processor registers with the memory element, the memory buffer and in-out element.

Further, none of the registers, and neither the gates nor the adder, has an operational delay between the receipt of input signals and the production of output signals. That is, the only delay in these processor logic circuits is due to their propagation and response times, and these are held to a practical minimum. There are no delay components as such, and like those commonly inserted for logical purposes to enable the emission of an output signal from an element simultaneously with a change of state of the element in response to an input signal. Thus, the gates, registers and adder have minimal operational delay, often referred to herein as "zero delay."

With this arrangement, the processor element transfers digital information from one register therein to a second register when the control element simultaneously enables all the gates in the path between the first register and the second register. The control signals applied to the gates to execute the information transfers are short levels, illustratively of 200-nanosecond duration.

DESCRIPTION OF DRAWINGS

For a fuller understanding of the nature and objects of the invention, reference should be had to the following detailed description taken in connection with the accompanying drawings, in which.

DESCRIPTION OF PREFERRED EMBODIMENT

Figure 1:
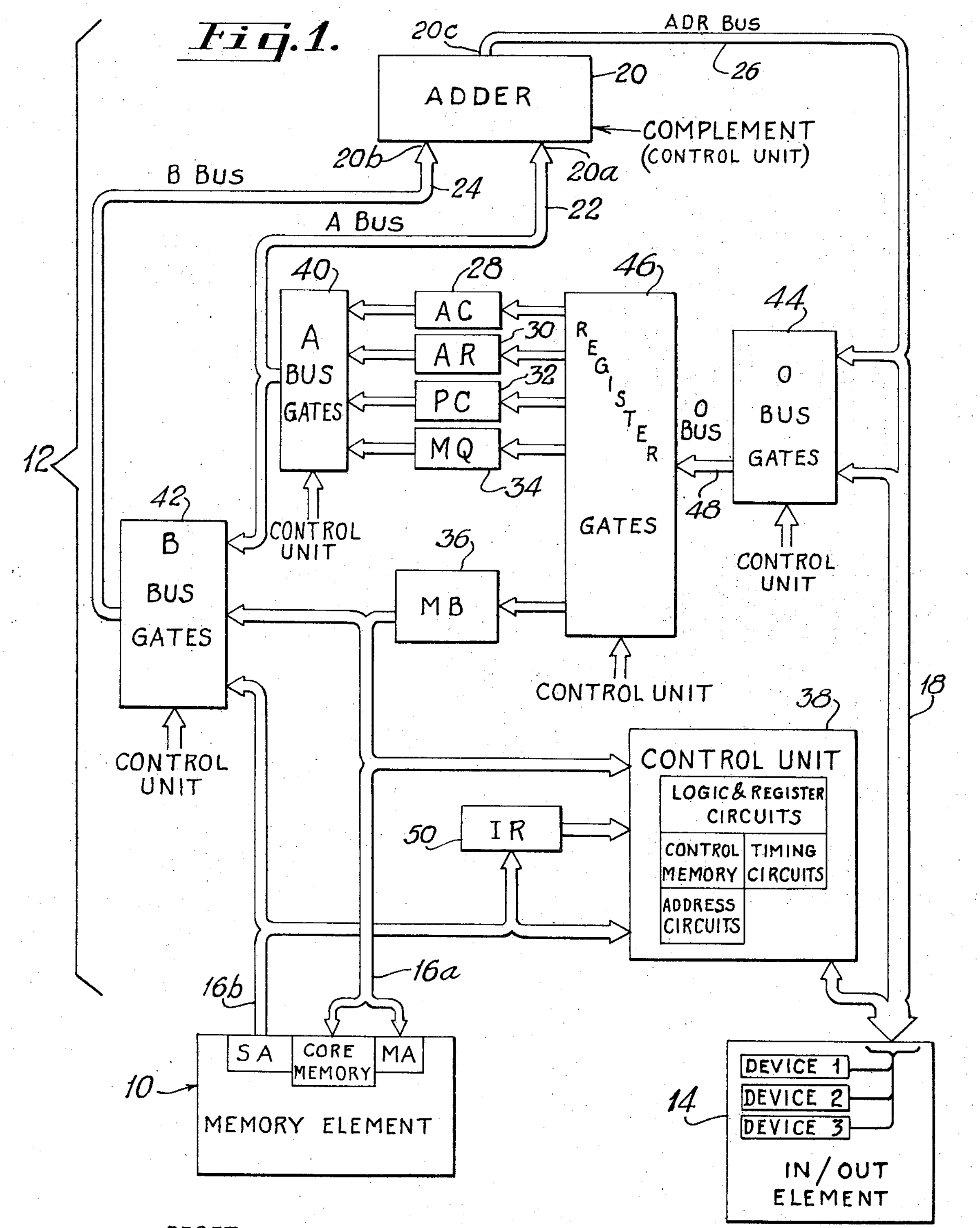
FIG. 1 is a block schematic diagram of a data processing system embodying the invention.

Data Processing System of FIG. 1

More specifically, as shown in FIG. 1, a digital data processing system embodying the invention has a memory element indicated generally at 10, a processor element indicated generally at 12 and an in-out element 14.

The memory element 10 is suitably a core memory. Input information is applied to a memory address (MA) register therein, and to the core memory for rewriting, from the processor element 12 via a memory-out bus **16*a*, and sense amplifiers (SA) in the memory element apply words read from the core memory to the processor via a memory-in bus 16*b***.

An in-out bus 18 connects the in-out element 14 with the processor element.

In the processor element 12, a parallel adder 20 receives at input ports 20*a* and 20*b* the binary words on an A bus 22 and on a B bus 24, respectively. The adder applies, essentially without delay, the logical sum of the two input words to an adder output (ADR) bus 26 connected to its output port 20*c* The operation of the adder 20 for two-digit binary words is summarized in the following table; the rightmost digit of each word is the least significant. The present adder processes larger words, typically 18 bits long, with the same logic.

TABLE I

| | | | | | | | | |
|---|---|---|---|---|---|---|---|---|
| A Bus | 00 | 01 | 10 | 11 | 00 | 01 | 10 | 11 |
| B Bus | 00 | 01 | 10 | 11 | 11 | 10 | 01 | 00 |
| ADR Bus | 00 | 10 | *00 | *10 | 11 | 11 | 11 | 11 |

*Carry out one.

Further, the adder can be complemented, illustratively with a control signal from the control unit 38. In response to a complement signal, the adder forces carry into every stage. In particular, an 18-bit adder 20 would illustratively have eighteen stages, each receiving an addend bit and an augend bit from the A and B buses, and also having a carry-in input and a complement input. Each stage produces an assertive carry-out signal only when two or more of its augend, addend and carry-in inputs receive assertive signals. Further, each stage produces an assertive sum signal when one or three of (*a*) the addend, (*b*) the augend and (*c*) either (or both) the carry-in or complement inputs receive assertive signals.

The adder bus 26 applies the binary words output from the adder 20 to a set of 0 bus gates 44 and to output conductors of the in-out bus 18. These gates are normally disabled or open, i.e., they block input signals from their output terminals. The 0 bus gates 44 also receive the signals applied to the bus 18 by the in-out element. In response to signals from a control unit 38, the gates 44 channel the information applied to them to a set of register gates 46 that, in turn, channel the information to one of five registers: an accumulator (AC) 28, an arithmetic register are 30, a program counter (PC) 32, a multiplier quotient register (MQ) 34 and a memory buffer register (MB) 36.

The four registers 28, 30, 32 and 34 apply the binary words stored therein to the A bus 22 through a set of normally disabled A bus gates 40. Signals from control unit 38 enable selected A bus gates, thereby applying the word in one of these four registers 28—32 in parallel to the A bus.

Similarly, the memory buffer register (MB) 36 and the memory element 10 (via the bus 16*b*) apply binary words stored therein to the B bus 24 through a set of normally disabled B bus gates 42 which are also operated by the control unit 38. In addition, in response to signals developed in the memory element, the contents of the memory buffer 36 can be loaded into the memory element 10 via the bus 16*a*.

As noted above, the processor registers 28—36 have essentially zero delay between the receipt of input signals and the production of output signals in response to them. More particularly, the illustrated accumulator 28, arithmetic register 30, program counter 32, multiplier quotient register 34 and memory buffer 36 are constructed with zero-delay flip-flops. Essentially, as soon as input signals are applied to any of these registers, the word previously stored therein can no longer be obtained. The register output signals begin to change substantially instantaneously in response to the input signals. Further, the A bus gates 40, the B bus gates 42, and O bus gates 44 and the register gates 46 all operate with essentially zero delay after receiving enabling input signals. Also, the adder 20 operates according to table I without significant delay.

The processor element 12 of FIG. 1 transfers a binary word between the memory buffer 36 and any one or more of the four registers 28, 30, 32, and 34 in a single operating sequence, termed a transfer cycle. For example, to transfer a word from the memory buffer to the arithmetic register, the control unit 38 simultaneously:

1. operates the B bus gates 42 to apply the memory buffer word to the B bus, which applies it to the adder 20;
2. operates the O bus gates 44 to apply the information on the adder bus 26 to the O bus 48; and
3. operates the register gates 46 to channel the information on the O bus to the arithmetic register 30.

The A bus gates 40 are not operated. Therefore, the word on the A bus corresponds to a binary zero. With the gates in this position, the adder 20 receives the word in the memory buffer and the binary number ZERO from the A bus. The adder substantially immediately applies the logical sum of these two words, which is the word in the memory buffer, to the adder bus 26. The O bus gates 44 and register gates 46 immediately transfer this word from the adder bus to the arithmetic register 30. Specifically, the register gates 46 effect a "jam" transfer of the word on the O bus 48 into the arithmetic register, and whatever information was in the arithmetic register is lost and the word on the O bus is stored therein.

This complete transfer can be completed with relatively elementary circuits in a very brief interval determined by the operating speed of the processor's logic circuits. The control unit preferably develops the control signals for executing the transfer for the entire interval. Thereafter, the processor element is ready to initiate another transfer cycle. That is, no material delay is required between successive transfer cycles. The control unit 38 only has to remove the control signals produced for the prior transfer, so that all gates are disabled, and can then immediately apply the control signals for the next transfer cycle.

With further reference to FIG. 1, the control unit 38 receives instruction-identifying information from an instruction register 50 and from the memory buffer 36. In response, it produces the control signals that cause the rest of the processor element to perform the information transfers required to execute the program in process. The illustrated control unit has timing circuits, including a clock, for scheduling the processor operations. It also includes a control memory; this is a read-only (fixed) memory that stores the combinations of control signals required for each of the numerous possible logical operations that can be performed in one transfer cycle.

Address circuits in the control unit 38 address the control memory according to the input signals to the control unit and to status signals generated within the control unit. At times determined with the timing circuits, the control signals stored at the selected address in the control memory are applied to logic and register circuits that also are located in the control unit. The latter circuits apply control signals to the several gates 40, 42, 44, 46 and, sometimes, to the adder 20 for the brief interval required to execute a specific logical operation. The control unit 38 can also be arranged to modify the control signals obtained from the control memory in accordance with the contents of either the instruction register or the memory buffer; this operation is carried out in the unit's logic and register circuits.

Thus, the control unit 38 is basically a coding device. It decodes the instruction signals it receives, suitably energizing one terminal or conductor uniquely associated with the instruction. This single energized conductor is then encoded, suitably with a read-only memory, in conjunction with a timing device to produce simultaneously the several control signals required to execute the instruction.

PROCESSOR CIRCUITS FOR BIT (15); FIG. 2

Figure 2:
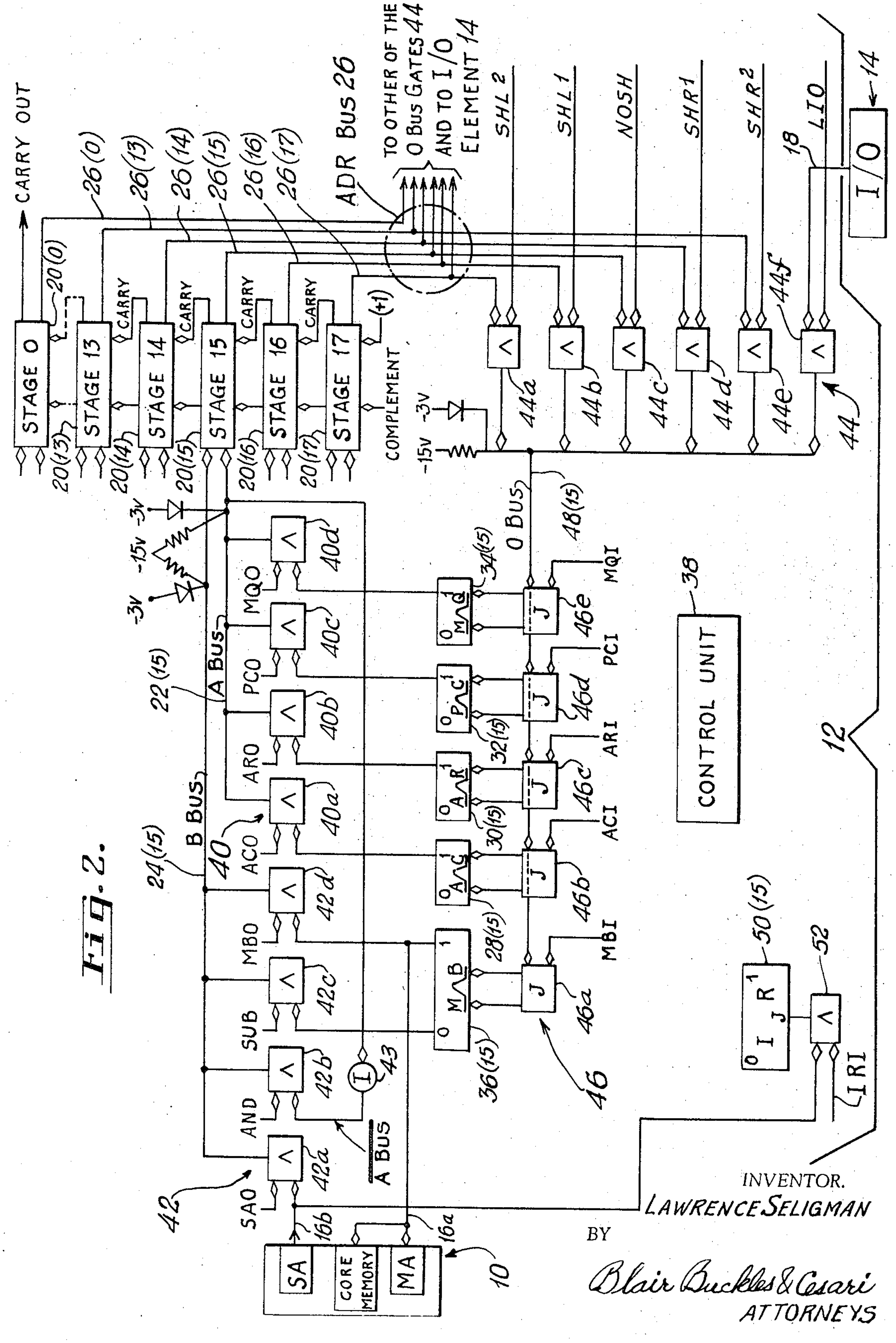
FIG. 2 is a block schematic diagram of the data processing system of FIG. 1 showing further details of the processor element.

FIG. 2 shows the arrangement of the FIG. 1 processor element 12 for handling one bit of a data word; the illustrated circuit is for a bit other than an end bit. Assume that the data processing system operates with 18 bit words; the least significant bit being bit (17) and written at the right end of the word, and the most significant being bit (0). The circuit illustrated in FIG. 2 processes bit (15), the third least significant bit. The circuit for processing the other 17 bits are basically identical. Numerous changes can be introduced according to the organization of the software, the arrangement of the address words, and like programming refinements.

The single illustrated stage of each register 28—36 and 50 is a zero-delay flip-flop designated with the FIG. 1 reference numeral of that register plus the suffix (15) to identify that the stage is associated with bit (15). For example, the flip-flop in the memory buffer register 36 associated with bit (15) is indicated in FIG. 2 as a memory buffer flip-flop 36 (15).

Further, six stages of the adder 20 are shown in FIG. 2; these are the stages associated with bits (0) and (13) through (17) and are respectively designated 20(0), 20(13), 20(14), 20(15), 20(16) and 20(17). Each adder stage receives a complement signal from the control unit 38. In addition, the adder stage 20(17) for the least significant bit receives a (+1) signal from the control unit. This signal is processed in the same way as a carry-in signal, i.e., it increases by one binary count the number otherwise applied to the adder bus 26.

Further, the bit (0) adder stage develops a carry-out signal in addition to the sum signal it applies to the adder bus conductor 26(0). This carry-out signal can be disregarded. Alternatively, it can be applied to a register for storage or to an alarm circuit to indicate that the number output from the adder exceeds the capacity of that device. The choice depends on factors that are not part of this invention.

The sum output signal from each adder stage is applied to a separate conductor in the adder bus 26, as indicated. In addition, the bit (16) adder stage 20(16) receives a carry-in signal from the next lower significance stage 20(17) and it applies a carry-out signal to the adder stage 20 (15). Similarly, the carry-out signal from each other adder stage is applied to the next higher significance stage as a carry-in signal.

With further reference to FIG. 2, the adder stage 20(15) receives signals on the A bus conductor 22(15) and on the B bus conductor 24(15). Similarly, the two input terminals on each of the other adder stages are connected to the A bus conductor and B bus conductor having the same significance. Each of these conductors, in addition to each conductor of the O bus 48, is normally clamped, illustratively to −3 volts. This level identifies a binary ZERO. A binary ONE is applied to each bus conductor by raising its potential to ground, i.e., by grounding it.

The ONE output level from the accumulator flip-flop 28(15) is applied to an AND gate 40*a* whose output signal is applied to the A bus conductor 22(15). The gate 40*a* is enabled with an accumulator output (ACO) control signal from the control unit 38. Similarly, an AND gate 40*b* applies the ONE output level from the arithmetic register flip-flop 30(15) to the A bus conductor 22(15) when it receives an (ARO) control signal from the control unit 38. A PCO control signal applied to an AND gate 40*c* transfers the ONE output level from the program counter flip-flop 32(15) to the A bus, and an MQO control signal applied to an AND gate 40*d* transfers the ONE output level from the multiplier quotient flip-flop 34(15) to the A bus. These four gates 40*a*, 40*b*, 40*c* and 40*d* constitute the A bus gates 40 associated with bit (15).

In the same manner, an AND gate 42*d* applies the ONE output level from the memory buffer flip-flop 36(15) to the B bus conductor 24(15) when that gate receives an (MBO) signal from the control unit. Also, the ZERO output level from the memory buffer flip-flop 38(15) is applied to the B bus conductor 24(15) by way of an AND gate 42*c* enabled with a subtract (SUB) control signal.

As indicated in FIG. 1, the output from the memory element 10 can also be applied to the B bus 24. This is done as shown in FIG. 2 by applying the memory element sense amplifier output signal to an AND gate 42*a* enabled with an SAO control signal; the gate output signal is applied to the B bus conductor 24(15). A further AND gate 42*b* applies a binary ONE to the B bus conductor 24(15) when the A bus conductor 22(15) is at the ZERO level and the gate receives an AND control signal; the A bus signal is applied to this gate through an inverter 43. The four coincidence gates 42*a*, 42*b*, 42*c* and 42*d* are the B bus gates 42 associated with the B bus conductor 24(15).

Figure 3:
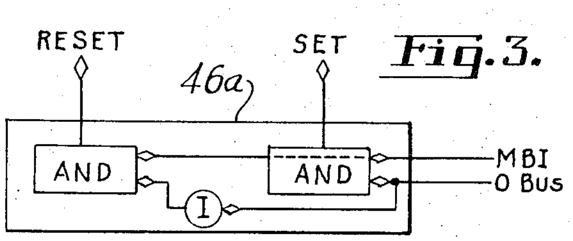
FIG. 3 shows one construction for a JAM gate used in the system of FIG. 1.

Five JAM gates 46*a* through 46*e* constitute the register gates 46 associated with bit (15). The two output leads from each of these gates is applied to the two input terminals, set and reset, on one of the flip-flops 28(15), 30(15), 32(15), 34(15) and 36(15) as shown in FIG. 2. One input to each of these register gates is the O bus line 48(15). The other input is a "register input" control signal produced in the control unit 38 when information on the O bus is to be read into one of the registers 28—36. As shown in FIG. 3, the JAM gate 46*a*, typical of the other JAM gates, has a first AND circuit that applies an assertive signal to the flip-flop set terminal when it receives a ONE on the O bus conductor while the MBI signal is present. A second AND circuit applies an assertive signal to the flip-flop reset terminal when the inverted O bus signal is a ONE (i.e., when O bus is ZERO) and the MBI signal is present. Thus, when it receives the MBI signal, the gate 46*a* places the flip-flop 36(15) in the state identified by the signal on the O bus conductor 48(15).

Applied to the O bus line 48(15) is the output signal from each of six O bus AND gates 44 associated with bit (15). One O bus gate 44*c* receives the sum signal from the adder stage 20(15) and a no-shift (NOSH) control signal. A shift-left one (SHL1) control signal is applied to an O bus gate 44*b* that receives the sum signal from the adder stage 20(16). Similarly, a gate 44*a* applies to the O bus conductor 48(15) the sum signal from the adder stage 20(17) when that gate receives a shift-left two (SHL2) control signal. Two further O bus gates 44*d* and 44*e* apply to the O bus line 48(15) the sum signals from the adder stages 20(14) and 20(13) in response, respectively, to shift-right one (SHR1) and shift-right two (SHR2) control signals. The final O bus gate 44*f* receives the incoming IO bus conductor associated with bit (15) and applies the level thereon to the O bus conductor 48(15) in response to a load in-out (LIO) control signal.

EXAMPLE I. MEMORY TO MEMORY BUFFER TRANSFER

The operation of the processor element 12 will now be described with further reference to FIGS. 1 and 2. As a first example, assume that the memory address of an instruction word has been read into the memory address register (MA) of the memory element 10 and that the instruction word at this memory address is to be transferred to the memory buffer 36. Further, assume that the low-order portion (e.g., bits 14—17) of this word contains the instruction code and that at least this portion of the word is to be transferred to the instruction register 50.

Within the memory element 10, when a binary ONE in the core memory is read out and applied to the sense amplifiers (SA), the sense amplifier output pulse is conventionally a pulse. A typical duration for this pulse is 320 nanoseconds, which is longer than the 200 nanosecond control signal level with which the illustrated processor operates.

When the processor control unit 38 receives a signal synchronized with the strobing of the memory sense amplifiers (i.e., synchronized with the transfer of the memory word to the sense amplifiers), the control unit produces the SAO, NOSH, MBI and IRI control signals essentially simultaneously and timed to terminate no later than the sense amplifier pulse.

These control signals provide a signal path through the processor element from the memory element sense amplifier for bit (15) to the memory buffer flip-flop 36(15), and provide a further path into the instruction register flip-flop 50(15). In particular, the SAO signal enables the B bus gate 42*a* to apply the sense amplifier output pulse for bit (15) to the B bus conductor 24(15). There is no information on the A bus and hence the output from the adder stage 20(15) identifies the bit (15) digit from the sense amplifier. The NOSH control signal enables the O bus gate 44*c* to apply the digit from the adder state 20(15) to the O bus conductor 48(15) and the MBI signal enables the register gate 46*a* to transfer this bit into the memory buffer flip-flop 36(15).

Simultaneously, the IRI signal enables an AND gate 52 to apply the digit received from the sense amplifier to the instruction register flip-flop 50(15).

As noted above, the control unit 38 develops the control signals as brief direct current levels. They persist for mutually coincident times and terminate simultaneously after any disturbances produced by their leading edges have died out. Thus, even if such a disturbance or other noise signal causes an erroneous switching of the memory buffer flip-flop 36(15), for example, the binary information is applied to the JAM input terminals of this flip-flop after the noise signal terminates. Hence, after the noise dies out, the level applied to its JAM terminal switches the flip-flop to the correct state.

Thus, when the control unit 38 terminates the SAO, NOSH, MBI and IRI control signals, the instruction word read from memory is stored in the memory buffer 36 and at least the portion thereof identifying the instruction is in the instruction register 50.

EXAMPLE II. MEMORY BUFFER TO PROGRAM COUNTER TRANSFER WITH INCREMENT

Assume that the low order memory buffer bits contain the memory address of an instruction word and that the instruction word for the next operation is stored in the next successive memory address. To store the address of this next instruction word in the program counter, the control unit 38 simultaneously develops the MBO, (+1), NOSH, and PCI control signals. With reference to FIG. 2 and bit (15) of the instruction word, the MBO signal enables the gate 42*d* to transfer the contents of the memory buffer flip-flop 36(15) to the B bus conductor 24(15). No information is on the A bus 22. However, the (+1) control signal, which the control unit 38 applies to the least significant adder stage 20(17), causes the adder 20 to increase by one binary count the word the adder applies to the bus 26 in response to the word on the B bus. Bit (15) of this incremented word output from the adder is transferred through the O bus gate 44*c*, enabled by the NOSH signal, to the O bus conductor 48(15). The register gate 46*d* enabled by the PCI signal then JAM transfers this level into the program counter flip-flop 32(15).

The duration of the control signals is sufficient for a carry to propagate through all the adder stages. Thus, when the control unit removes the control signals, the program counter contains the memory address of the next instruction word. The initial instruction word is still available in the memory buffer, since this register did not receive input signals and was not cleared.

EXAMPLE III. ADD AND SHIFT

As a further example of the operation of the processor element 12 with continued reference to both drawings, assume that the number in the accumulator 28 is to be added to the number in the arithmetic register 30 and the sum shifted one place to the left, i.e., to a higher significance stage. Such an add and shift operation is used, for example, in multiplying two binary numbers.

When two numbers are to be added with the instant processor element, one must be applied to the adder on the A bus and the other on the B bus. Therefore, the word in the accumulator will first be transferred to the memory buffer register. However, assuming further that the present memory buffer word is to be retained, this in turn requires placing that word in another register. Simultaneous application of the MBO, NOSH and MQI control signals performs this operation by loading the memory buffer word into the multiplier quotient register 34. The memory buffer, of course, also still contains that word.

The binary number in the accumulator register 28 is transferred to the memory buffer 42 in a subsequent transfer cycle by simultaneous production of the ACO, NOSH and MBI control signals. These signals provide a path through the adder 20 from the accumulator register 28 to the input of the memory buffer 36.

The add and shift operation is then performed with the simultaneous application of the MBO, ARO, SHL1 and ACI control signals. The MBO signal applies the word formerly in the accumulator and now in the memory buffer to the adder 20 via the B bus. The ARO signal applies the number in the arithmetic register to the adder via the A bus. This output from the adder is the logical sum of the two numbers thus applied to it.

Now, however, the sum digits from the adder stages are not applied to equal significance stages of the accumulator. Rather, each sum digit is applied to the next higher significance stage of the accumulator. Consider the sum digit output from the adder stage 20(16). As shown in FIG. 2, it is applied to the O bus gate 44*b* that feeds the O bus conductor 48(15). Accordingly, when this gate is enabled with the SHL1 control signal, it applies the bit (16) sum digit to the O bus conductor 48(15). From there, the gate 46*b* enabled by the ACI signal JAM transfers it into the accumulator flip-flop 28(15). The bit (15) sum digit from adder stage 20(14) is transferred to the O bus conductor for bit (14) by a like O bus gate (not shown) and transferred to the accumulator bit (14) flip-flop. The sum output signal from each other stage is similarly transferred into the accumulator flip-flop associated with the next higher significance digit.

Where desired, the highest significance bit output from the adder can be "saved" by providing the accumulator with one extra stage in addition to the 18 stages required to process 18-bit words. For this operation, in a shift-left operation as just described, the highest significance bit (O) from the adder stage 20(O) would be applied to an extra 0-bus gate enabled with a SHL1 signal. The output signal from this gate would then be JAM transferred into the extra accumulator stage.

The add and shift operation thus requires only a single transfer cycle when one operand number is in the memory buffer and the other is in a register connected to the A bus. However, when the two initial numbers are in registers both connected to the A bus, as in the present example, and the memory buffer contents must be saved, the three required transfer cycles can be completed in a total time of 600 nanoseconds, i.e., only three times the illustrated 200-nanosecond period for each transfer cycle. Shorter operating times can be attained with higher speed circuits and shorter gating levels. The illustrated 200 nanosecond cycle time is suitably used with 10 MHz circuits. Alternatively, slower logic circuits can readily be used. However, the use of faster logic circuits often does not result in substantial gains in overall operating speed of the data processing system. This is because the comparatively slow operating speed of the system's memory element may limit the overall operating rate.

The foregoing add operation also reveals that the present processor element generally requires one more register than a conventional processor element of like capability. This extra register stores the sum of the two numbers combined in the adder. In a conventional processor element, two numbers are added by storing one number in a register that can add the other number thereto and store the resultant number. However, in the processor element 12, there are no registers of this type and therefore an additional register is required. Where desired, any of the registers 28—36 can be arranged to complement or shift the number stored therein, but none is arranged to combine an incoming number with the number already stored therein.

EXAMPLE IV. LOGICAL AND OPERATION

As a further illustration of the operation of the instant processor element 12, a logical AND operation will be performed. The truth table for a logical add operation, as performed above in Example III with a shift, is:

| A Bus | B Bus | Logical Add |
|---|---|---|
| 0 | 0 | 0 |
| 0 | 1 | 1 |
| 1 | 0 | 1 |
| 1 | 1 | [1]0 |

[1] With a carry-out.

The truth table for a logical AND operation, on the other hand, differs significantly, as follows:

| Input 1 | Input 2 | Logical AND |
|---|---|---|
| 0 | 0 | 0 |
| 0 | 1 | 0 |
| 1 | 0 | 0 |
| 1 | 1 | 1 |

Thus, in performing a logical AND operation between two binary digits, equal-significance digits are multiplied.

With particular reference to bit (15), the processor element 12 employs the B bus gate 42*b* (FIG. 2) in executing the logical AND operation. When enabled with an AND control signal, this gate applies a binary ONE to the B bus conductor 24(15), which is normally clamped to the level of a binary ZERO, only when the A bus conductor 22(15) carries a binary ZERO. Otherwise, the gate output is at the ZERO level.

Assume that the two numbers to be combined are stored in the memory buffer 36 and in the arithmetic register 30, and that the resultant is to be loaded into the accumulator register 28. The control unit 38 then produces the following signals to execute the logical AND operation: MBO, ARO, AND, COMPLEMENT, NOSH and ACI The two output signals, MBO and ARO, place the binary numbers in the memory buffer and arithmetic register on the B bus and A bus, respectively, and the NOSH and ACI signals apply the adder output number to the accumulator register without any shifting.

The consequence of applying the AND and COMPLEMENT control signals is illustrated as follows. Assume the four least significant bits of the number in the arithmetic register, and hence on the A bus conductors 22(17) through 22(14), are 1100 and, further, that the corresponding bits of the number in the memory buffer are 1010; the rightmost digits being the least significant. Because the AND signal constrains each B bus conductor to carry a binary ONE when the equal-significance A bus conductor carries a binary ZERO, the digits on the B bus conductors 24(17)–24(17) are 1011. Accordingly, omitting for a moment the COMPLEMENT control signal applied to the adder 20, the four least significant bits of the adder output would be the logical sum of the A bus digits 1100 and of the B bus digits 1011, or 0111 with a carry-out.

However, the COMPLEMENT control signal causes the adder output to be the logical equivalence of these input digits, or 1000. These digits, stored in the accumulator, are the desired resultant of a logical AND operation with the two four-digit numbers initially in the arithmetic register and the memory buffer.

Thus, the processor element also can execute a logical AND operation with a single transfer cycle. It should be noted that when the COMPLEMENT control signal generates a carry in the adder, this carry signal can effectively be discarded, because the next higher significance adder stage receives the COMPLEMENT signal directly. That is, when a stage in the adder receives both a carry-in signal and a COMPLEMENT signal, it changes its state only once. The stage effectively OR's together the carry-in and the COMPLEMENT input signals. It does not change state twice, but only once.

With further reference to FIG. 2, a gate 42*c* transfers the one's complement of the bit (15) digit in the memory buffer flip-flop 36(15) to the B bus when the gate receives a SUB control signal. This enables the processor 12 to subtract the number in the memory buffer from the number in the accumulator, for example, with the adder 20 in a single transfer cycle.

A principal advantage of the instant processor element 12 is the ability to operate with relatively simple logic circuits. The reason the logic circuits can be relatively simple is that they do not require delays and because they are controlled with levels rather than pulses. Further, due to their simplicity, these circuits have relatively high reliability and therefore need little maintenance. Nevertheless, with these simple circuits the processor element provides essentially the same operation found in many prior advanced data processing systems.

Also, the use of short levels rather than pulses to transfer information within the processor element, and between it and other elements of the computing system, materially diminishes the probability of noise signals causing an erroneous operation.

Further, the processor element is highly flexible in that information originating anywhere within the data processing system, including elsewhere in the processor element, usually can be transferred to any processor register, or to another system element, with one transfer cycle.

The present invention also makes possible cost savings in the initial purchase of the processor element. The simple no-delay logic circuits of the processor element are less costly than the corresponding circuits used in prior digital computing systems. Also, the processor element requires roughly half the gating circuits of prior art computers having similar capability. This saving in the cost of the gating circuits more than offsets the cost of providing one additional register in the processor element, as discussed above.

A further feature is that the present processor element executes operations such as are called for by multiply, divide and shift instructions, with comparatively few registers and gate circuits and in comparatively short times. For example, to shift the contents of the accumulator 28, FIG. 1, in one transfer cycle the contents can be transferred to another register, suitably the arithmetic register 30, with a shift. Immediately thereafter the contents are transferred back to the accumulator with a second shift. Thus, with only one set of shift gates, i.e., the O bus gates 44*a*, 44*b*, 44*d* and 44*e*, two shifts are obtained in two successive transfer cycles.

As another example of the efficiency of the processor element, to multiply a binary multiplicand with a binary multiplier, it requires only two transfer cycles for each digit in the multiplier. Thus, the processor element executes a multiply with an 18-bit multiplier in 36 transfer cycles. Where the processor element executes each transfer cycle in 200 nanoseconds as noted above, this entire operation can be completed in 7,200 nanoseconds.

Further, only one register feeding the B bus, i.e., the memory buffer register 36, and three registers feeding the A bus, i.e., the accumulator register 28, the arithmetic register 30 and the memory quotient register 34, are required for the multiply operation. And again, it is executed with only the single set of shift gates in the O bus gates 44.

For example, to execute a multiply instruction, the processor element preferably initially loads the multiplicand into the memory buffer, the multiplier in the memory quotient register and the number of multiplier digits in a step counter. The accumulator register and arithmetic register are initially cleared.

The first transfer cycle for each multiplier bit adds the multiplicand to the partial product and shifts the result one place to the right when the multiplier is a ONE. If the multiplier bit is a ZERO, in this transfer cycle the partial product is simply shifted one place to the right. Simultaneously, in either case, the carry-out signal from the highest significance stage 20(O) of the adder 20 is inserted in the most significant place of the register storing the shifted partial product. The overflow, i.e., the lowest significance bit of the partial product prior to shifting, is stored in a one-bit "temporary storage" register.

The second transfer cycle for each multiplier bit shifts the multiplier one place to the right and inserts the temporary storage bit in the most significant place of the register storing the shifted multiplier.

A suitable six transfer-cycle sequence for executing a multiply in this manner stores the partial product in the arithmetic register during the first cycle, and places the shifted multiplier in the accumulator in the second cycle. In the third transfer cycle, the partial product is transferred, with a shift, to the multiplier quotient register, and in the next, fourth, transfer cycle, the multiplier is shifted and stored in the arithmetic register. In the fifth transfer cycle, the partial product is shifted and placed in the accumulator register, and in the sixth transfer cycle, the multiplier is shifted and stored in the memory quotient register. This sequence illustrates how only three zero-delay registers, in addition to the memory buffer which is storing the multiplicand, and one set of zero-delay shift gates, arranged as described above, execute the multiply operation with comparatively high speed. These same advantages are realized in executing divide instructions and long shifts.

The present invention thus provides a new processor element for digital data processing systems. The processor element comprises zero-delay registers, a zero-delay parallel adder, and zero-delay gating circuits. The registers are arranged in two groups, and the gating circuits apply the output signals from the registers in each group in parallel to the adder. Normally, the gates are operated to apply the contents of only one register in each group to the adder. In the illustrated processor, only the memory buffer register is in the second group of registers, all other registers are in the first group. However, the memory element of the data processing system applies words read therefrom to the adder through the same gates as the memory buffer.

The output signals from the adder are applied to both groups of registers and to the system in-out element and, further, are applied to the memory element by way of memory buffer register. A set of gates is again interposed in each of these paths from the output of the adder in order to control the data transfers. The in-out element also applies words originating therein to the registers through the same gates as the adder.

The processor element also includes a control unit producing the control signals for the gates and the adder. The signals are short levels. The control unit produces all the control signals required to provide a desired signal path, i.e., all those identified with a set of substantially coincident inputs to the control unit, simultaneously or at least at intervals that terminate simultaneously. Should the adder, for example, have an operating time longer than the desired control signals, the control signals for a single transfer cycle can be applied in two time-spaced subgroups, with each subgroup having coincident signals. The first subgroup of control signals would apply the input information to the adder and the second subgroup of control signals would transfer the adder output information to the selected register.

The control unit operates in response to its own status and to the contents of an instruction register in the processor element. It can also operate in response to the contents of other processor registers, such as the memory buffer register. Further, the control unit is generally connected with the memory element and the in-out element of the data processing system to synchronize transfers between these elements of the system and the processor element.

It should also be noted that in the illustrated processor element, the control unit is the only source of gating or other control signals. Further, all the gates are enabled with only a single signal, i.e., a control signal from the control unit. This is in contrast to many prior data processing systems, which have several devices applying control-type signals to the processor logic circuits. Also, in prior processor elements, the coincidence of two or more control signals is required to enable many of the gating circuits.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

I claim:

1. Digital data processing apparatus comprising:

A. digital arithmetic means (20);
  1. having first and second input ports (20*a*, 20*b*) and an output port (20*c*);
  2. for developing at said output port electrical signals that are a selected arithmetic function of electrical signals applied to said first and second input ports;

B. a plurality of digital registers (28, 30, 32, 34, 36) arranged in first and second groups, each of said groups comprising at least one register;

C. first and second gating means (40, 42)
  1. respectively in circuit between said first group of registers and said first input port of said arithmetic means and between said second group of registers and said second input port of said arithmetic means;
  2. each of said first and second gating means being operative in response to control signals applied thereto to transfer electrical signals identifying digital information in any register connected therewith to said arithmetic means;

D. third gating means (44, 46)
  1. in circuit between said output port of said arithmetic means and said first and second groups of registers;
  2. operative in response to control signals applied thereto to apply the signals from said output (from) port of said arithmetic means to one of said registers; and E. control means (38) coupled to said first, second and third gating means and adapted to be responsive to a selected set of instruction-identifying signals for simultaneously applying to said gating means all control signals in a selected set of control signals in response to the set of instruction-identifying signals.

2. Apparatus according to claim 1 wherein each said register has essentially zero delay between the receipt of an input signal from said third gating means and the application of a signal responsive to said input signal to one of said first and second gating means.

3. Apparatus according to claim 2 wherein said control means produces all said control signals developed in response to a set of input signals thereto at mutually coincident and simultaneously terminating times.

4. Apparatus according to claim 1 wherein said control means generates said control signals as direct voltage levels.

5. Apparatus according to claim 1 wherein said second gating means (42) further comprise means for applying to said second input port of said arithmetic means a selected function of the electrical signals applied to said first input port in response to said control means.

6. Apparatus according to claim 1 wherein:

A. said arithmetic means (20)
  1. is a digital adder producing at its output port the logical sum of the digital signals applied to its first and second input ports; and
  2. has a plurality of input conductors (22) at said first input port and a like plurality of conductors (24) at said second input port, each conductor at said first input port being associated with one conductor at said second input port; and B. said second gating means (42) are adapted for applying to each conductor at said second adder input port a first digital signal only when said first digital signal is absent from the associated conductor at said first adder input port.

7. Apparatus according to claim 1 further comprising an input-output element (14):

A. coupled to said third gating means (44, 46) to apply signals from said input-output element to said registers by way of said third gating means; and B. coupled to said arithmetic means to receive signals only from said output port thereof.

8. Apparatus according to claim 1:

A. further comprising a memory element (10)
  1. in circuit with at least one register (36) in said second group thereof to receive information therefrom; and
  2. coupled to said second gating means (42) to apply information output from said memory element to said arithmetic means by way of said second gating means.

9. Digital data processing apparatus according to claim 1 in which:

A. said arithmetic means is a parallel digital adder;

B. each of said first, second and third gating means is coupled to said digital adder for transferring signals between the one or more registers connected therewith and said adder in parallel; and C. said adder and each of said registers and each of said gating means operates with essentially zero delay between the receipt of input signals and the production of output signals in response to said input signals.

10. Apparatus according to claim 1 wherein said control means is further arranged to:

A. respond to said instruction-identifying signals to identify the information transfers required to perform the instruction said signals identify; and B. apply enabling signals to said gating means to provide the signal paths required for said identified information transfers simultaneously.

11. A digital processor element arranged to process multiple-digit words, said processor element comprising:

A. a parallel digital adder (20)
  1. having first and second input ports (20*a*, 20*b*) and an output port (20*c*);
  2. automatically producing at said output port digital signals identifying the logical sum of the digital numbers identified by signals applied to said input ports;
  3. producing said sum signals without appreciable delay after receipt of said input signals;

B. a substantially zero-delay memory buffer register (36) having input terminals and output terminals;

C. at least second and third substantially zero-delay registers (28, 30), each having input terminals and output terminals;

D. first coincidence gates (40)
  1. in circuit between the output terminals of each of said second and third registers and said first adder input port; and
  2. operative in response to control signals to apply output signals from each of said second and third registers in parallel to said first adder input port;

E. second coincidence gates (42):
  1. in circuit between the output terminals of said memory buffer register and said second adder input port; and
  2. operative in response to control signals to apply output signals from said memory buffer register in parallel to said second adder input port;

F. third coincidence gates (44, 46)
  1. in circuit between said adder output port and said input terminals of said memory buffer register and, of said second register and of said third register; and
  2. operative in response to control signals to apply the digital information output from said adder in parallel to any of said three registers; and G. control means (30) for generating all of the control signals for said first, second and third coincidence gates simultaneously.

12. A processing element according to claim 11 wherein said control means (30) is:
  1. arranged to apply control signals to said gates and to receive signals from at least one of said registers;
  2. for producing selected combinations of control signals in response to the signals applied thereto; and
  3. for producing at mutually overlapping times all the control signals developed in response to the input signals applied thereto at substantially the same time.

13. A processor element for processing multiple-digit works in a digital data processing system, said processing element comprising:

A. a parallel multiple-stage digital adder (20*a*)
  1. having first and second input ports (20*a*, 20*b*) and an output port (20*c*); and
  2. producing at said output port the logical sum of the digital signals applied to said input ports without appreciable delay after receipt thereof, B. a multiple-conductor A bus (22) connected to said first adder input port;

C. a multiple-conductor B bus (24) connected to said second adder input port; each conductor of said A bus being associated with one conductor of said B bus;

D. first, second, third and fourth digital registers (28, 30, 32, 34, 36) having substantially zero delay;

E. a first group of coincidence gates (40) coupled to said first, second and third registers and said A bus to transfer digital signals stored in each of said first, second and third registers to said A bus in response to selected control signals;

F. a second group of coincidence gates (42)
  1. coupled to said fourth register and said B bus to transfer both digital signals stored in said fourth register (36) and the complements thereof to said B bus in response to selected control signals; and
  2. including means responsive to selected control signals from said control means for applying a second level signal to each B bus conductor when an associated conductor of said A bus carries said second level signal;

G. a multiple-conductor O 0-bus (48);

H. a group of register gates (46) coupled to said O bus and to said registers for transferring digital signals from said O bus to any one of said registers; and I. a group of O bus gates (44) connected between said adder output port and said O bus for transferring to each O bus conductor the output signal from any one of a plurality of stages of said adder.

14. A processor element according to claim 13:

A. further comprising a control unit (38)
  1. adapted to receive instruction-identifying signals and connected with said gates; and
  2. for producing in response to different input signals different combinations of substantially simultaneous control signals to provide a signal path at least from the inputs to one of said first and second groups of gates to said adder output port.